United States Patent [19]

Shimamura et al.

[11] Patent Number: 5,415,257
[45] Date of Patent: May 16, 1995

[54] CLUTCH STRUCTURE

[75] Inventors: Teruo Shimamura; Kenji Matsuda; Fujiwara Osami, all of Sakai, Japan

[73] Assignee: Kubota Corporation, Osaka, Japan

[21] Appl. No.: 124,091

[22] Filed: Sep. 20, 1993

[30] Foreign Application Priority Data

Oct. 26, 1992 [JP] Japan .................................. 4-286536

[51] Int. Cl.$^6$ ............................................. F16D 67/02
[52] U.S. Cl. ..................................... 192/15; 192/12 C; 74/411.5
[58] Field of Search ..................... 192/15, 12 C, 18 A, 192/7; 74/411.5

[56] References Cited

U.S. PATENT DOCUMENTS

| | | | |
|---|---|---|---|
| 3,244,405 | 4/1966 | Hanning | 192/15 X |
| 3,485,109 | 12/1969 | Dunlap | 74/411.5 X |
| 5,249,666 | 10/1993 | Gorski et al. | 74/411.5 X |

FOREIGN PATENT DOCUMENTS

| | | | |
|---|---|---|---|
| 0022411 | 1/1981 | European Pat. Off. | 74/411.5 |
| 4-19225 | 1/1992 | Japan . | |

*Primary Examiner*—Andrea L. Pitts
*Attorney, Agent, or Firm*—Townsend & Townsend Khourie and Crew

[57] ABSTRACT

A clutch mechanism having a drive shaft operatively connected to a drive section of a working vehicle, and a driven shaft connected to a working implement such as a mower unit. The clutch mechanism includes a clutch mounted on the drive shaft to be operable between an ON state to transmit drive from the drive shaft to the driven shaft, and an OFF state to break drive transmission; a transmission shaft connected to the clutch; and a shift device connected to the clutch to be shiftable between a first position corresponding to the ON state of the clutch and a second position corresponding to the OFF state of the clutch. The shift device has a clutch control device shiftable to control the clutch, and a first helical gear axially movably mounted on the transmission shaft. The clutch mechanism further includes a second helical gear rotatable with the driven shaft and meshed with the first helical gear, and a brake for applying a braking force to the shift device when the shift device is in the second position. The first and second helical gears are shaped such that the second helical gear applies a reaction to the first helical gear to push the first helical gear toward the first position when the clutch is in the ON state to transmit the drive from the drive shaft to the driven shaft, and the second helical gear applies a force to the first helical gear to push the first helical gear toward the second position when the clutch is in the OFF state and a force is transmitted from the driven shaft.

19 Claims, 3 Drawing Sheets

CLUTCH STRUCTURE

BACKGROUND OF THE INVENTION

1. Field of the Invention

The present invention relates to a PTO clutch for use in a lawn mower, tractor or the like.

2. Description of the Related Art

In a conventional lawn mower or other working vehicle, a working implement such as a mower unit continues to operate by inertia for a time after being disconnected from drive. To eliminate this inconvenience, a conventional lawn mower has a drum type brake apparatus as disclosed in Japanese Utility Model Publication Kokai No. 4-19225. However, the drum type brake apparatus requires brake elements to be attached as additional components of the vehicle. This results in the disadvantages of enlarging the entire structure and increasing cost.

SUMMARY OF THE INVENTION

An object of the present invention is to provide a working vehicle having a working implement such as a mower unit with means to stop the working implement continuing to operate by inertia after a PTO clutch is disengaged, without enlarging the structure and without increasing cost.

The above object is fulfilled, according to the present invention, by a clutch mechanism having a drive shaft operatively connected to a drive section of a working vehicle, and a driven shaft connected to a working implement such as a mower unit. The clutch mechanism includes a clutch mounted on the drive shaft to be operable between an ON state to transmit drive from the drive shaft to the driven shaft, and an OFF state to break drive transmission; a transmission shaft connected to the clutch; and a shift device connected to the clutch to be shiftable between a first position corresponding to the ON state of the clutch and a second position corresponding to the OFF state of the clutch. The shift device has a clutch control device shiftable to control the clutch, and a first engaging member axially movably mounted on the transmission shaft. The clutch mechanism further includes a second engaging member rotatable with the driven shaft and meshed with the first engaging member, and a brake for applying a braking force to the shift device when the shift device in the second position. The second engaging member applies a reaction to the first engaging member to push the first engaging member toward the first position when the clutch is in the ON state to transmit the drive from the drive shaft to the driven shaft. The second engaging member applies a force to the first engaging member to push the first engaging member toward the second position when the clutch is in the OFF state and a force is transmitted from the driven shaft.

After the clutch is disengaged, the working implement may continue to operate by inertia though the drive is no longer transmitted to the driven shaft. In such a case, according to the above construction, a braking force is applied to the first engaging member to stop the working implement. This structure does not require a separate brake mechanism, thereby overcoming the disadvantages of enlarging the structure and increasing cost.

Further and other objects, features and effects of the invention will become more apparent from the following more detailed description of the embodiment of the invention taken with reference to the accompanying drawings.

DETAILED DESCRIPTION OF THE PREFERRED EMBODIMENT

An embodiment of the present invention will be described hereinafter with reference to the drawings.

Figure 1:
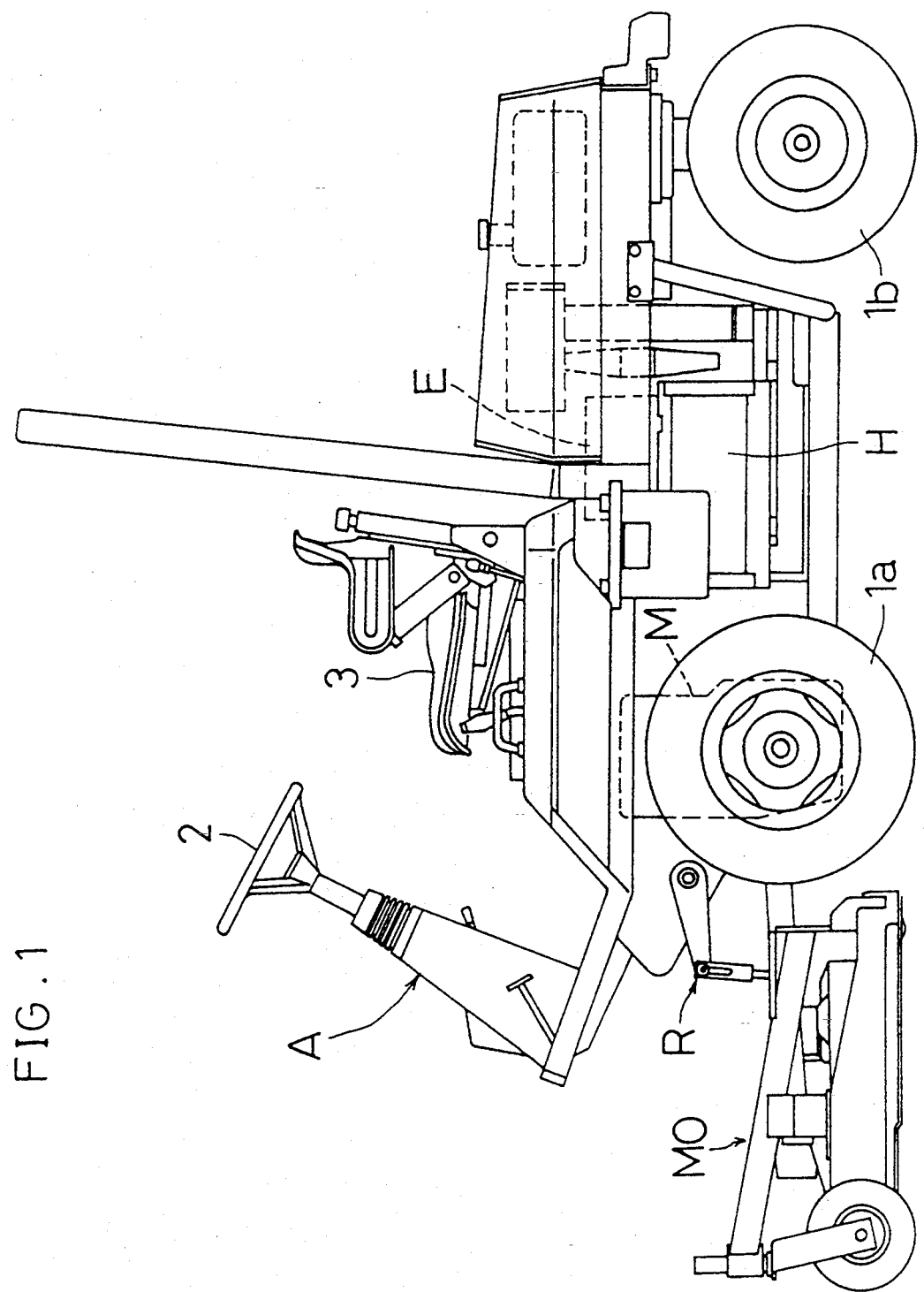
FIG. 1 is a side view of a lawn mower according to the present invention.

FIG. 1 shows a lawn mower having an engine E, a propelling transmission case M, front drive wheels 1a, steerable rear wheels 1b, a steering wheel 2 and a driver's seat 3. A mower unit MO is vertically movably connected to a front position of a vehicle body A through a raising and lowering link mechanism R.

Output of the engine E is used both for propelling the lawn mower and for driving the mower unit MO. In a propelling system, the engine output is transmitted through a hydrostatic stepless transmission H and a transmission mounted in the propelling transmission case M to drive the front wheels 1a. In a mower unit driving system, the engine output is transmitted to the mower unit MO through a PTO clutch mechanism C described hereunder.

The PTO clutch mechanism C will be described with reference to FIG. 2. The PTO clutch mechanism C includes a drive shaft 4, a driving clutch member 5, a driven clutch member 7, a piston 8 and a biasing spring 9. The driving clutch member 5 is rotatable with the drive shaft 4, and has an annular plate 5a. The driven clutch member 7 is splined to a transmission shaft 6 acting as a relay shaft rotatable independently of the drive shaft 4, and has annular plates 7a frictionally engageable with the annular plate 5a of the driving clutch member 5. These annular plates 7a are simply called a clutch herein. The piston 8 is axially slidable inside the driven clutch member 7. A plurality of pins 12 extend through a radial wall of the driven clutch member 7.

The driven clutch member 7 includes a small diameter portion 7b to which a first helical gear 10 acting as a first engaging member is splined to be axially slidable. As seen from FIG. 2, the pins 12 extend axially through the first helical gear 10 as well as the driven clutch member 7. A ring plate 13 is fixed to the ends of the pins 12 remote from the driven clutch member 7 to retain the first helical gear 10 in place. A brake shoe 14 is fixed to an inner wall of a clutch housing Ha opposed to a peripheral surface of the first helical gear 10. Alternatively, the brake shoe 14 may be mounted on the first helical gear 10. The first helical gear 10 is meshed with a second helical gear 11 rotatable with a driven shaft P. This second helical gear 11 is also called a second engaging member herein. The driven shaft P is connected to the mower unit MO.

Figure 2:
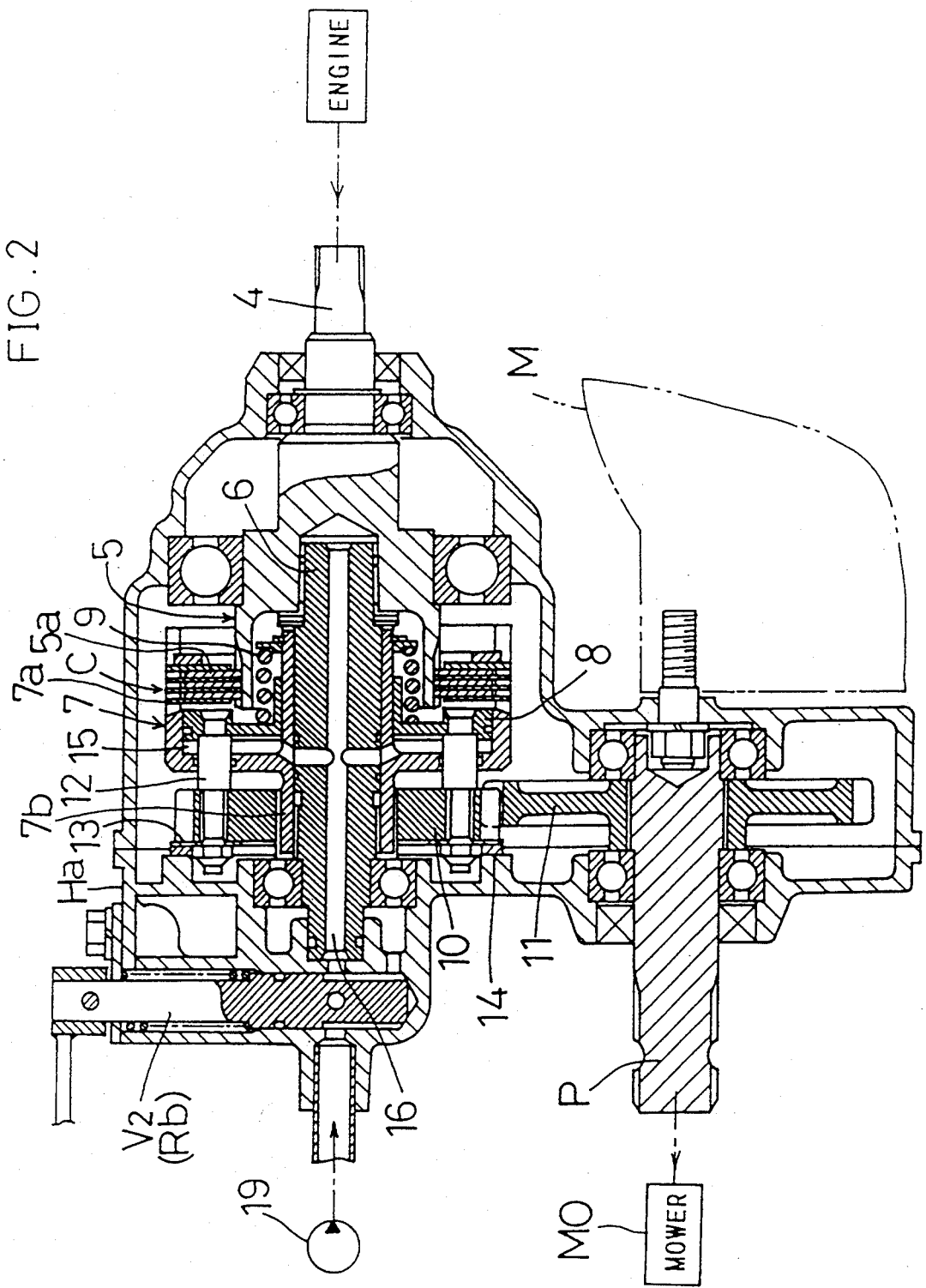
FIG. 2 is a sectional view of a clutch mechanism having a brake mechanism according to the present invention.

As shown in FIG. 2, an oil passage 16 is formed axially of the transmission shaft 6, which receives pressurized oil from a pressure source 19 under control of a rotary control valve V2 supported by the clutch housing Ha. The pressure oil, under control of the control valve V2, flows through the oil passage 16 to a cylinder chamber 15 defined in the piston 8. The resulting hydraulic pressure pushes the piston 8 rightward in FIG. 2 to move the driven annular plates 7a into frictional engagement with the driving annular plate 5a. This state of the clutch is called ON state. When the pressure oil is exhausted, the biasing spring 9 returns the piston 8 to the position shown in FIG. 2. In this state, which is called OFF state, drive is not transmitted from the drive shaft 4 to the transmission shaft 6. The rotary control valve V2 is vertically slidable relative to the clutch housing Ha to act also as a relief valve Rb in the hydraulic circuit.

The piston 8 and pins 12 constitute a clutch control device which, in combination with the first helical gear 10, is called a shift device herein. The shift device is movable between a first position and a second position corresponding to the above-noted ON state and OFF state, respectively. That is, in the first position, the piston 8 lies rightward in FIG. 2 to place the driven annular plates 7a in frictional engagement with the driving annular plate 5a, and the pins 12 places the first helical gear 10 rightward. In the second position, the piston 8, pins 12 and first helical gear 10 are in the respective positions shown in FIG. 2.

Figure 3A:
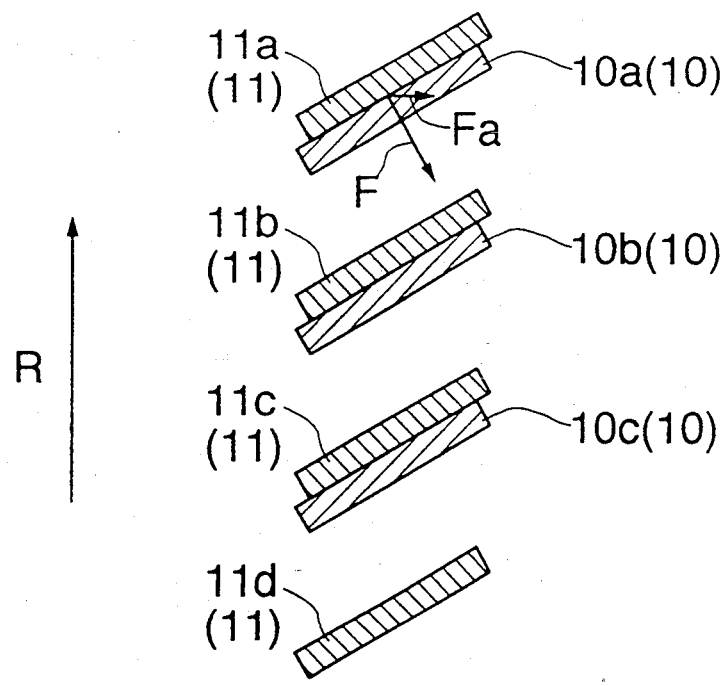
FIG. 3A is a schematic view of engagement between teeth of a first helical gear and a second helical gear of the clutch mechanism shown in FIG. 2, in which drive is transmitted from the first helical gear to the second helical gear.
Figure 3B:
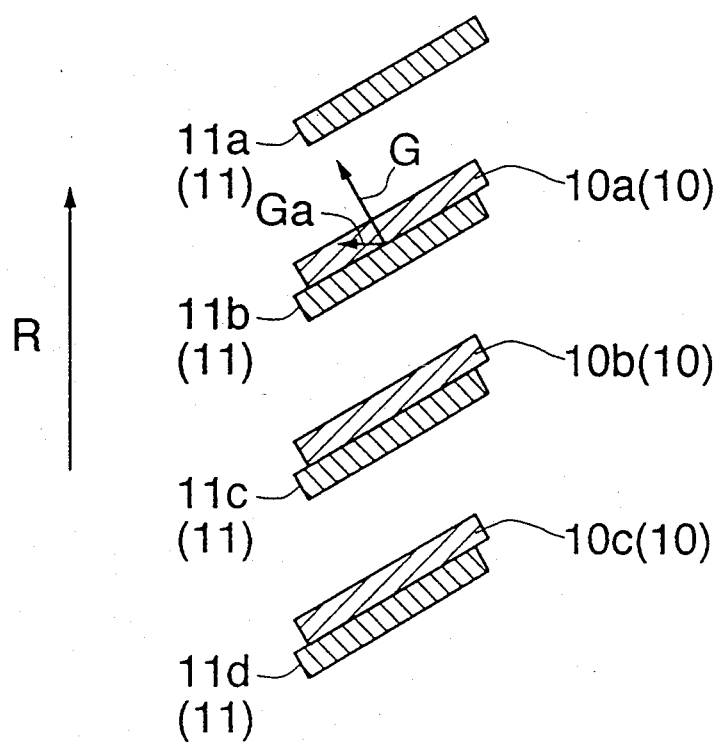
FIG. 3B is a schematic view similar to FIG. 3A, in which the drive is disconnected and an inertial force of a working implement such as a mower unit is transmitted from the second helical gear to the first helical gear.

The key concept of the present invention will be described next with reference to FIGS. 3A and 3B. In FIGS. 3A and 3B, references 10a through 10c denote a series of teeth of the first helical gear 10, and references 11a through 11d a series of teeth of the second helical gear 11 corresponding thereto. In FIG. 3A the clutch is in ON state and the teeth of the first helical gear 10 and second helical gear 11 are engaged to transmit drive from the first helical gear 10 to the second helical gear 11. Arrow R denotes a direction of rotation, and hence the first helical gear 10 and second helical gear 11 have axes of rotation extending perpendicular to arrow R. The first position in which the clutch is in ON state is rightward in FIGS. 3A and 3B, and the second position leftward.

The tooth 10a of the first helical gear 10, for example, is in contact with the tooth 11a of the second helical gear 11. The tooth 10a is applying a force to the tooth 11a, and receiving a reaction force F from the tooth 11a. The reaction F force includes an axial component Fa pushing the tooth 10a rightward in FIG. 3A.

When the clutch changes to OFF state to disconnect the first helical gear 10 from the drive, the first helical gear 10 stops rotating but the mower unit MO continues to rotate by inertia for a while. The rotation of the mower unit MO causes the tooth 11b of the second helical gear 11 to move away from the tooth 10b and engage the tooth 10a of the first helical gear 10. This is the case with the other teeth also. Consequently, the first helical gear 10 is rotated by the second helical gear 11. At this time, the second helical gear 11 applies a force G to the first helical gear 10. This force G includes an axial component Ga, whereby the axially movable first helical gear 10 is pushed leftward in FIG. 2. As a result, the first helical gear 10 moves into pressure contact with the brake shoe 14 mounted on the inner wall of the clutch housing Ha, whereby a brake becomes operative to stop the mower unit MO. Thus, the teeth of the first helical gear 10 and second helical gear 11 are inclined relative to the transmission shaft 6 in a direction to cause part of the reaction to the drive to push the first helical gear 10 toward the first position when the clutch is in ON state. In FIGS. 3A and 3B, the teeth of the helical gears are shown, for simplicity of illustration, to have a straight sectional shape in the circumferential direction. Within the technical scope of the present invention, these teeth may have a curved sectional shape as long as the above effect is produced.

The simple construction described above is effective to stop a working implement such as a mower unit rotating by inertia after the clutch is operated to OFF state to disconnect the working implement from the engine.

The key concept of the present invention resides in the brake mechanism utilizing the inertia noted above. The working implement is not limited to the mower unit exemplified in the foregoing description. In the described embodiment, the pins 12 extend through the first helical gear 10 to be axially movable together. Instead, the clutch control device may be disconnected from the first helical gear 10 to be movable independently of the latter.

What is claimed is:

1. A clutch mechanism having a drive shaft operatively connected to a drive section of a working vehicle, and a driven shaft connected to a working implement, said clutch mechanism comprising:
    a clutch mounted on said drive shaft operable between an ON state to transmit drive from said drive shaft to said driven shaft, and an OFF state to break drive transmission from said drive shaft to said driven shaft;
    a transmission shaft connected to said clutch;
    shift means connected to said clutch shiftable between a first position corresponding to said ON state of said clutch and a second position corresponding to said OFF state of said clutch, said shift means including:
        clutch control means shiftable to control said clutch; and
        a first helical gear axially movably mounted on said transmission shaft;
    a second helical gear rotatable with said driven shaft and meshed with said first helical gear; and
    brake means for applying a braking force to said shift means when said shift means in said second position;
    wherein said first helical gear and said second helical gear are shaped such that said second helical gear applies a first reaction force to said first helical gear to push said first helical gear toward said first position when said clutch is in said ON state to transmit the drive from said drive shaft to said driven shaft, and said second helical gear applies a second reaction force to said first helical gear to push said first helical gear toward said second position when said clutch is in said OFF state and a force is transmitted from said driven shaft.

2. A clutch mechanism as defined in claim 1, wherein said brake means includes a brake shoe.

3. A clutch mechanism as defined in claim 2, further comprising a clutch housing for supporting said drive shaft and said driven shaft, said brake shoe being attached to said clutch housing.

4. A clutch mechanism as defined in claim 2, wherein said brake shoe is attached to said shift means.

5. A clutch mechanism as defined in claim 1, wherein said brake means is contactable with said first helical gear.

6. A clutch mechanism as defined in claim 1, wherein said clutch control means includes a piston for pushing said clutch.

7. A clutch mechanism as defined in claim 6, wherein said transmission shaft includes an oil passage for transmitting hydraulic pressure from outside said clutch mechanism to said piston.

8. A clutch mechanism as defined in claim 7, further comprising a control valve for controlling said hydraulic pressure.

9. A clutch mechanism as defined in claim 8, wherein said control valve includes a slidable relief valve element.

10. A clutch mechanism as defined in claim 6, wherein said piston is biased by a spring toward said second position.

11. A clutch mechanism as defined in claim 6, wherein said piston extends axially through said first helical gear.

12. A clutch mechanism as defined in claim 1, wherein said first helical gear and said second helical gear have teeth inclined in such a direction with respect to said transmission shaft and said driven shaft that, when said clutch is in said ON state and said drive is transmitted to said shift means, said drive transmitted from said first helical gear to said second helical gear results in part of the first reaction force from said second helical gear pushing said first helical gear toward said first position.

13. A clutch mechanism as defined in claim 1, wherein said clutch includes an annular plate mounted on said drive shaft, and annular plates mounted on said transmission shaft.

14. A clutch mechanism as defined in claim 1, wherein said transmission shaft is disposed coaxial with said drive shaft.

15. A clutch mechanism as defined in claim 1, wherein said driven shaft extends parallel to said drive shaft.

16. A clutch mechanism as defined in claim 1, wherein said shift means is shiftable parallel to said transmission shaft between said first position and said second position.

17. A clutch mechanism having a drive shaft and a driven shaft, comprising:
   a clutch mounted on said drive shaft operable between an ON state to transmit drive from said drive shaft to said driven shaft, and an OFF state to break drive transmission from said drive shaft to said driven shaft;
   a transmission shaft connected to said clutch;
   shift means connected to said clutch shiftable between a first position corresponding to said ON state of said clutch and a second position corresponding to said OFF state of said clutch, said shift means including:
      clutch control means shiftable to control said clutch; and
      a first engaging member axially movably mounted on said transmission shaft;
   a second engaging member rotatable with said driven shaft and meshed with said first engaging member; and
   brake means for applying a braking force to said first engaging member when said shift means is in said second position;
   wherein said first engaging member and said second engaging member are shaped such that said second engaging member applies a first reaction force to said first engaging member to push said first engaging member toward said first position when said clutch is in said ON state to transmit the drive from said drive shaft to said driven shaft, and said second engaging member applies a second reaction force to said first engaging member to push said first engaging member toward said second position when said clutch is in said OFF state and a force is transmitted from said driven shaft.

18. A clutch mechanism as defined in claim 17, wherein said first engaging member and said second engaging member are helical gears.

19. A clutch mechanism having a drive shaft and a driven shaft, comprising:
   a clutch mounted on said drive shaft operable between an ON state to transmit drive from said drive shaft to said driven shaft, and an OFF state to break drive transmission from said drive shaft to said driven shaft;
   a transmission shaft connected to said clutch;
   shift means connected to said clutch shiftable between a first position corresponding to said ON state of said clutch and a second position corresponding to said OFF state of said clutch, said shift means including:
      clutch control means shiftable to control said clutch; and
      a first engaging member mounted on said transmission shaft to be axially movable independently of said clutch control means;
   a second engaging member rotatable with said driven shaft and meshed with said first engaging member; and
   brake means for applying a braking force to said first engaging member when said shift means is in said second position;
   wherein said first engaging member and said second engaging member are shaped such that said second engaging member applies a first reaction force to said first engaging member to push said first engaging member toward said first position when said clutch is in said ON state to transmit the drive from said drive shaft to said driven shaft, and said second engaging member applies a second reaction force to said first engaging member to push said first engaging member toward said second position when said clutch is in said OFF state and a force is transmitted from said driven shaft.

* * * * *